(12) United States Patent
Gim (10) Patent No.: US 9,980,355 B2
(45) Date of Patent: May 22, 2018

(54) LED DRIVER PROVIDED WITH TIME DELAY CIRCUIT

(71) Applicant: LG INNOTEK CO., LTD., Seoul (KR)

(72) Inventor: Taek Gyu Gim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days. days.

(21) Appl. No.: 15/396,918

(22) Filed: Jan. 3, 2017

(65) Prior Publication Data
US 2017/0196071 A1    Jul. 6, 2017

(30) Foreign Application Priority Data
Jan. 5, 2016 (KR) .................. 10-2016-0001129

(51) Int. Cl.
*H05B 37/02* (2006.01)
*H05B 33/08* (2006.01)

(52) U.S. Cl.
CPC ..... *H05B 37/0281* (2013.01); *H05B 33/0815* (2013.01); *H05B 33/0845* (2013.01); *H05B 33/0854* (2013.01); *H05B 33/0887* (2013.01); *Y02B 20/42* (2013.01)

(58) Field of Classification Search
CPC ............ H05B 33/08; H05B 33/0815; H05B 33/0845; H05B 33/0875; H05B 33/0887; H05B 37/02; H05B 37/0281
See application file for complete search history.

(56) References Cited

U.S. PATENT DOCUMENTS

| | | | |
|---|---|---|---|
| 2012/0161640 A1* | 6/2012 | Kimura | H05B 33/0815 315/127 |
| 2013/0221867 A1* | 8/2013 | Deppe | H05B 33/0809 315/224 |
| 2014/0009080 A1* | 1/2014 | Xu | H05B 33/0815 315/224 |

* cited by examiner

*Primary Examiner* — Thai Pham
(74) *Attorney, Agent, or Firm* — LRK Patent Law Firm (57) ABSTRACT

A light emitting diode (LED) driver provided with a time delay circuit. The time delay circuit includes a power detector which detects whether alternating current (AC) power is applied and outputs a power detection signal when the AC power is applied, a time delayer which receives LED driving power, delays outputting the input LED driving power by a predefined delay time when the power detection signal is output from the power detector, and outputs a delay time completion signal, and a power outputter which outputs the LED driving power when the delay time completion signal is input from the time delayer.

21 Claims, 8 Drawing Sheets

LED DRIVER PROVIDED WITH TIME DELAY CIRCUIT

CROSS-REFERENCE TO RELATED APPLICATION

This application claims priority to and the benefit of Korean Patent Application No. 10-2016-0001129, filed on Jan. 5, 2016, the disclosure of which is incorporated herein by reference in its entirety.

BACKGROUND

1. Field of the Invention

The present invention relates to a light emitting diode (LED) driver provided with a time delay circuit.

2. Discussion of Related Art

A light emitting diode (LED) is widely used as a luminous element in recent lighting products. Lighting products use various types of light controllers to save energy.

The light controller sends a light control signal to an LED driver that provides power to an LED. The LED control signal may include a signal indicative of an amount of illumination or turned-on/off LED power. The LED driver can determine whether to supply power to an LED or strength of supplied power on the basis of the light control signal.

The LED driver supplies power to an LED simultaneously with a standby operation when alternating current (AC) power is input. When AC power is input, the light controller also starts to operate and sends a light control signal to the LED driver.

However, when the LED driver supplies driving power to the LED earlier than the light control signal and thus the light control signal is applied while the LED is operating, a flickering phenomenon may occur in the LED.

Conventionally, a micro control unit (MCU) has been used to adjust an operation of an LED driver and operation timing of a light controller, however a problem arises in that design cost increases and additional power consumption occurs when the MCU is used because the MCU operates as a separate device.

Therefore, it is necessary to provide an LED driver technology without using an MCU, which allows a design with low power loss.

SUMMARY OF THE INVENTION

The present invention is directed to providing a light emitting diode (LED) driver provided with a time delay circuit which supplies power to an LED later than a light control signal.

The technical objectives of the present invention are not limited to the above disclosure, and other objectives not described herein may become apparent to those of ordinary skill in the art on the basis of the following description.

According to an aspect of the present invention, there is provided a time delay circuit, including a power detector which detects whether alternating current (AC) power is applied and outputs a power detection signal when the AC power is applied, a time delayer which receives LED driving power, delays outputting of the input LED driving power by a predefined delay time when the power detection signal is output from the power detector, and outputs a delay time completion signal, and a power outputter which outputs the LED driving power when the delay time completion signal is input from the time delayer.

According to another aspect of the present invention, there is provided an LED driver provided with a time delay circuit, including a power supply to which AC power is input, a rectifier which rectifies the input AC power, a standby circuit which outputs LED driving power on the basis of the rectified AC power, a time delay circuit which receives the LED driving power and outputs the LED driving power to be delayed by a predefined delay time, and a light control circuit which receives a light control signal from a light controller and the LED driving power output from the time delay circuit and modifies the LED driving power according to the light control signal to provide as power for an LED, wherein the LED driving power is input to the light control circuit later than the light control signal.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present invention will be described in detail with reference to the accompanying drawings. Advantages and features of the present invention and methods of accomplishing them will be made apparent with reference to the accompanying drawings and embodiments to be described below. The present invention may, however, be embodied in different forms and is not to be construed as limited to the embodiments set forth herein. Rather, the embodiments are provided so that this disclosure is thorough and complete and fully conveys the inventive concept to those skilled in the art, and the present invention should only be defined by the appended claims. The same reference numerals indicate the same components throughout the specification.

Unless otherwise defined, all terms including technical and scientific terms used herein have the same meaning as commonly understood by one of ordinary skill in the art to which this present invention belongs. It should be further understood that terms such as those defined in commonly used dictionaries are not to be interpreted in an idealized or overly formal sense unless expressly so defined herein.

Figure 1:
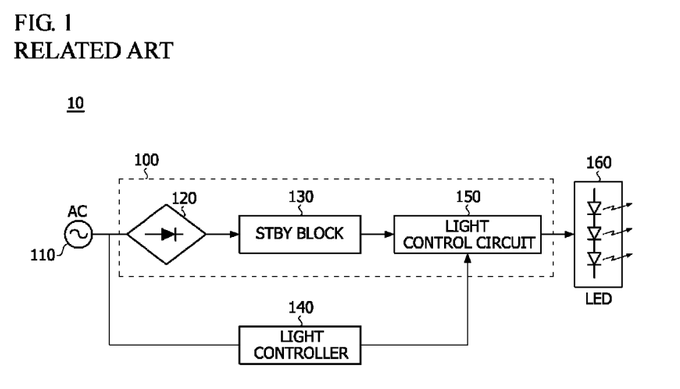
FIG. 1 is a view illustrating a conventional light emitting diode (LED) driver.

FIG. 1 is a view illustrating a conventional light emitting diode (LED) driver.

Referring to FIG. 1, a conventional LED lighting device 10 may include a power supply 110, an LED driver 100, a light controller 140, and an LED 160.

The power supply 110 may receive alternating current (AC) power. The AC power may be power supplied from a power plant to households, offices, or factories.

The LED 160 may be a luminous element including an LED.

The LED driver 100 may include a rectifier 120, a standby block (STBY block) 130, and a light control circuit 150.

The rectifier 120 may perform a rectifying action for converting AC power input from the power supply 110 into direct current (DC) power. The rectifier 120 may rectify a current from the AC power in only one direction and output the rectified power. The rectifier 120 may include a semiconductor rectifier, a vacuum tube rectifier, a silicon rectifier, a thyristor rectifier, or a mechanical rectifier.

The STBY block 130 may generate and output LED driving power required for driving the LED on the basis of the power output from the rectifier 120. The STBY block 130 may convert the rectified unidirectional current into a DC current with a constant amount and output the DC current.

The light control circuit 150 may generate and output power which matches an operating voltage of the LED 160. The light control circuit 150 may control an amount of the current from the power supplied to the LED 160 on the basis of a light control signal output from the light controller 140.

The light controller 140 may output the light control signal for controlling light of the LED 160 to the light control circuit 150. The light control signal may include signals indicating turning-on/off or light intensity of the LED 160.

The conventional LED lighting device 10 is not provided with a unit which adjusts timing of the light control signal output from the light controller 140 to the LED driver 100. When the light control signal is output from the light controller 140 while power is supplied from the LED driver 100 to the LED 160, a flicker may occur in the LED 160. Therefore, it is necessary to ensure that power is supplied from the LED driver 100 to the LED 160 later than the light control signal.

Figure 2:
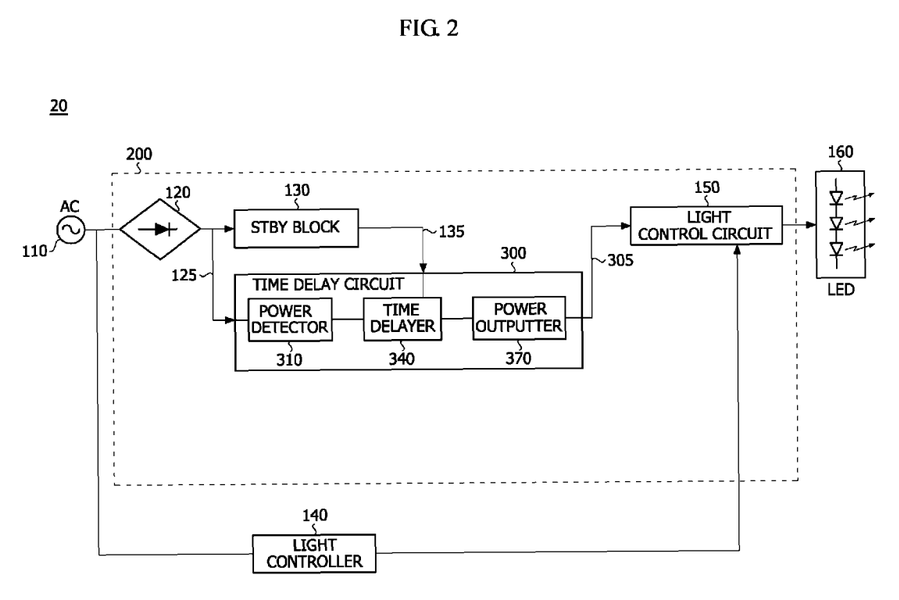
FIG. 2 is a view illustrating an LED driver provided with a time delay circuit according to one embodiment of the present invention.

FIG. 2 is a view illustrating an LED driver provided with a time delay circuit according to one embodiment of the present invention.

Referring to FIG. 2, an LED lighting device 20 including an LED driver 200 provided with a time delay circuit 300 according to one embodiment of the present invention is illustrated.

The LED lighting device 20 may include a power supply 110, a light controller 140, an LED 160, and the LED driver 200. Since the power supply 110, the light controller 140, and the LED 160 are the same as those included in the conventional LED lighting device 10 illustrated in FIG. 1, descriptions thereof will be omitted to avoid duplication.

The LED driver 200 may include a rectifier 120, a STBY block 130, the time delay circuit 300, and a light control circuit 150. Since the rectifier 120, the STBY block 130, and the light control circuit 150 are the same as those included in the conventional LED lighting device 10 illustrated in FIG. 1, descriptions thereof will be omitted to avoid duplication.

The time delay circuit 300 may include a power detector 310, a time delayer 340, and a power outputter 370.

The power detector 310 may detect whether power is applied to the LED driver 200. According to one embodiment of the present invention, an output of the rectifier 120 is input to the power detector 310 and the power detector 310 may detect whether power is applied on the basis of the output of the rectifier 120. When the power detector 310 detects applied power, the power detector 310 may output a power detection signal which indicates that power is applied.

The time delayer 340 receives the LED driving power and may delay outputting of the LED driving power by a predefined delay time when the power detection signal is input from the power detector 310 and output a delay time completion signal.

The time delayer 340 according to one embodiment of the present invention may use a resistor-capacitor (RC) circuit to implement the delay time. That is, a circuit in which a resistance value and a capacitance value are adjusted may be used so that time required for a capacitor to be fully charged by the input LED driving power is equal to the delay time.

The power outputter 370 may output the LED driving power when the delay time completion signal is output from the time delayer 340. The power outputter 370 may be connected to the time delayer 340, and the LED driving power input to the time delayer 340 may also be connected to the power outputter 370 via the time delayer 340. Accordingly, when the delay time completion signal output from the time delayer 340 is input to the power outputter 370, the LED driving power may be output from the power outputter 370.

Figure 3:
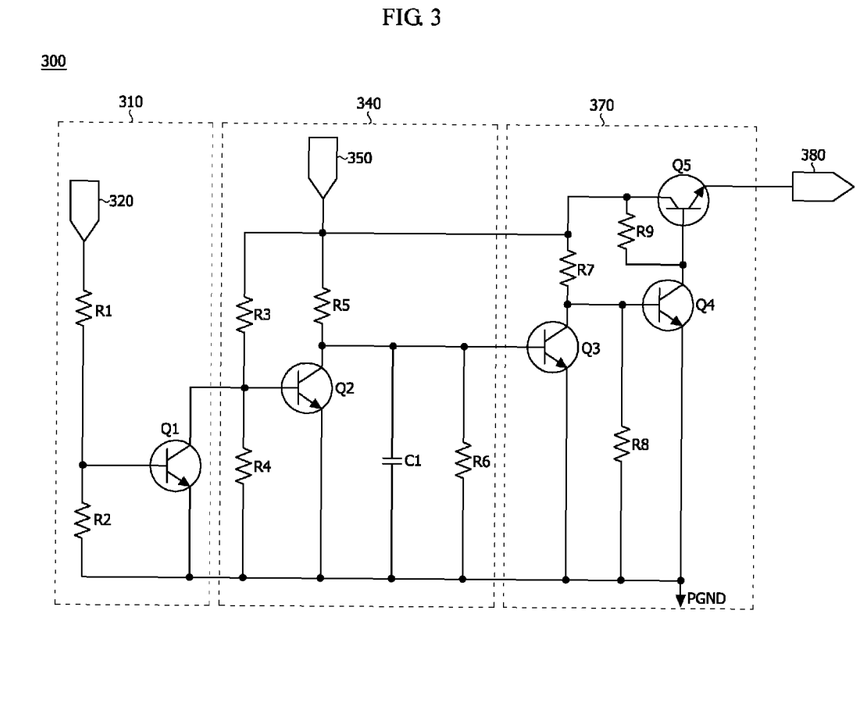
FIG. 3 is a view illustrating a time delay circuit according to one embodiment of the present invention.

FIG. 3 is a view illustrating a time delay circuit according to one embodiment of the present invention.

With reference to FIG. 3, the time delay circuit 300 according to one embodiment of the present invention will be described in detail.

The power detector 310 may include a detection terminal 320 and a first switch Q1.

The detection terminal 320 may be a terminal to which a signal that indicates whether power is applied is input. According to one embodiment of the present invention, an output 125 of the rectifier 120 may be input to the detection terminal 320.

A first switch Q1 is a switch which is turned on when a signal is input to the detection terminal 320. The first switch Q1 maintains a turned-off state when no signal is input to the detection terminal 320.

For example, the first switch Q1 may be a bipolar junction transistor (BJT) and the signal of the detection terminal 320 may be input to a base terminal of the BJT. When the first switch Q1 is a field effect transistor (FET), the signal of the detection terminal 320 may be input to a gate terminal. This is merely an example, and the first switch Q1 is not limited thereto.

When the first switch Q1 is turned on, a current flows in the first switch Q1. The power detector 310 may output the power detection signal which indicates that the first switch Q1 is turned on as described above. For example, the power detection signal may indicate that the current flows in the first switch Q1, however this is merely an example, and the present invention is not limited thereto.

The time delayer 340 may include a power input terminal 350, a first resistor R5, a second resistor R6, a second switch Q2, and a capacitor C1.

The power input terminal 350 may be a terminal to which the LED driving power is input. The LED driving power may be DC power that is output 135 from the STBY block 130 for driving the LED 160.

One end of the first resistor R5 is connected to the power input terminal 350, and the other end is connected to the second switch Q2.

The LED driving power is applied to the second switch Q2 and may be turned on when no power detection signal is output from the power detector 310. The second switch Q2 may be turned off when the power detection signal is output from the power detector 310.

The second switch Q2 and the first switch Q1 may be connected. For example, when the first switch Q1 and the second switch Q2 are BJTs, a collector terminal of the first switch Q1 and a base terminal of the second switch Q2 may be connected, and the second switch Q2 may be turned off when the first switch Q1 is turned on.

The second resistor R6 and the capacitor C1 may be connected in parallel to the second switch Q2. For example, when the second switch Q2 is a BJT, each of the second resistor R6 and the capacitor C1 may be connected in parallel to the collector terminal and an emitter terminal of the second switch Q2.

Since the second resistor R6 and the capacitor C1 are connected in parallel to the second switch Q2, one end of each of the second resistor R6 and the capacitor C1 may be connected to the first resistor R5.

When the second switch Q2 is turned off, a current due to the LED driving power may flow in the capacitor C1 and the second resistor R6 via the first resistor R5. The capacitor C1 may be charged by the current. When the capacitor C1 is fully charged, the time delayer 340 may output a delay time completion signal. The delay time completion signal may be a signal indicating a full charge of the capacitor C1. For example, the delay time completion signal may indicate a voltage between both ends of the fully charged capacitor C1.

According to one embodiment of the present invention, the time delayer 340 may delay outputting of the LED driving power until the capacitor C1 is fully charged. The delay time may be a predefined value. According to one embodiment of the present invention, the predefined delay time may be determined according to a capacitance value of the capacitor C1 and a parallel equivalent resistance value of the first resistor R5 and the second resistor R6.

When the parallel equivalent resistance value of the first resistor R5 and the second resistor R6 is $$"R = \frac{R_5 R_6}{R_5 + R_6}"$$

kΩ, a capacitance value of the capacitor C1 is C μF, a voltage value of the input LED driving power is $V_{in}$ V, and a voltage value is $V_o$ V when the capacitor C1 is fully charged, the delay time, which is t ms, may be determined according to equation $$"t = -RCLn\left(1 - \frac{V_o}{V_{in}}\right)."$$

For example, when the resistance value of the first resistor R5 is 510 kΩ, the resistance value of the second resistor R6 is 470 kΩ, the capacitance value of the capacitor C1 is 10 μF, $V_{in}$ is 12 V, and $V_o$ is 2 V, the delay time t may be 445.9 ms according to the above equation.

The power outputter 370 may include a third switch Q3, a fourth switch Q4, a fifth switch Q5, and a power output terminal 380.

The power input terminal 350 of the time delayer 340 and the power output terminal 380 are connected to the fifth switch Q5, and the LED driving power input to the power input terminal 350 may be output to the power output terminal 380 by a switching operation of the fifth switch Q5.

For example, when the fifth switch Q5 is a BJT, the power input terminal 350 may be connected to a collector terminal of the fifth switch Q5 and the power output terminal 380 may be connected to an emitter terminal of the fifth switch Q5. In this case, when a current flows in a base terminal of the fifth switch Q5, the fifth switch Q5 is turned on and the LED driving power input to the power input terminal 350 may be output to the power output terminal 380.

The third switch Q3 may be turned on when the delay time completion signal is output from the time delayer 340. The delay time completion signal may be input as a switching signal of the third switch Q3.

For example, when the third switch Q3 is a BJT, one end of the capacitor C1 may be connected to a base terminal of the third switch Q3. A voltage of the fully charged capacitor C1 may be an operating voltage for the third switch Q3. When the capacitor C1 is fully charged, a current flows in the base terminal of the third switch Q3 to turn on the third switch Q3.

When the third switch Q3 is turned on, the fourth switch Q4 connected to the third switch Q3 may be turned off. When the fourth switch Q4 is turned off, the fifth switch Q5 connected to the fourth switch Q4 may be turned on.

For example, when the third switch Q3, the fourth switch Q4, and the fifth switch Q5 are BJTs, a collector terminal of the third switch Q3 may be connected to a base terminal of the fourth switch Q4 and a collector terminal of the fourth switch Q4 may be connected to the base terminal of the fifth switch Q5. Here, when the third switch Q3 is turned on, no current flows to the base terminal of the fourth switch Q4 and the fourth switch Q4 may be turned off, and when the fourth switch Q4 is turned off, a current flows in the base terminal of the fifth switch Q5, and the fifth switch Q5 may be turned on.

According to one embodiment of the present invention, when the capacitor C1 of the time delayer 340 is fully charged, the third switch Q3, each of the fourth switch Q4, and the fifth switch Q5 is turned on, turned off, and turned on in sequence, and the LED driving power may be output from the time delay circuit 300 due to the turned-on fifth switch Q5. Therefore, the time required for charging the capacitor C1 may be the delay time, and the output of the LED driving power may be delayed by the delay time.

Figure 4:
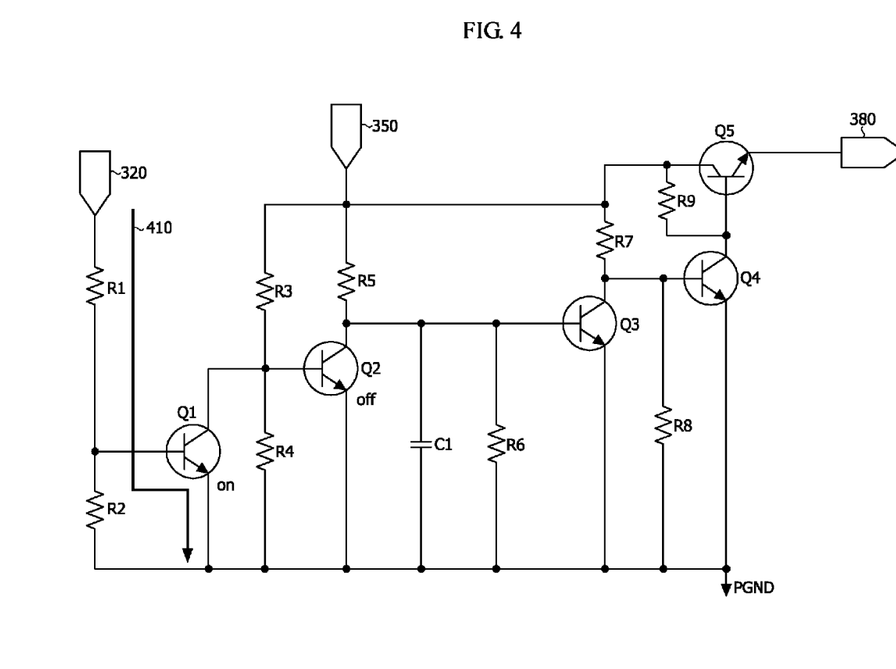
FIG. 4 is a view for describing detection of power in a time delay circuit according to one embodiment of the present invention.
Figure 5:
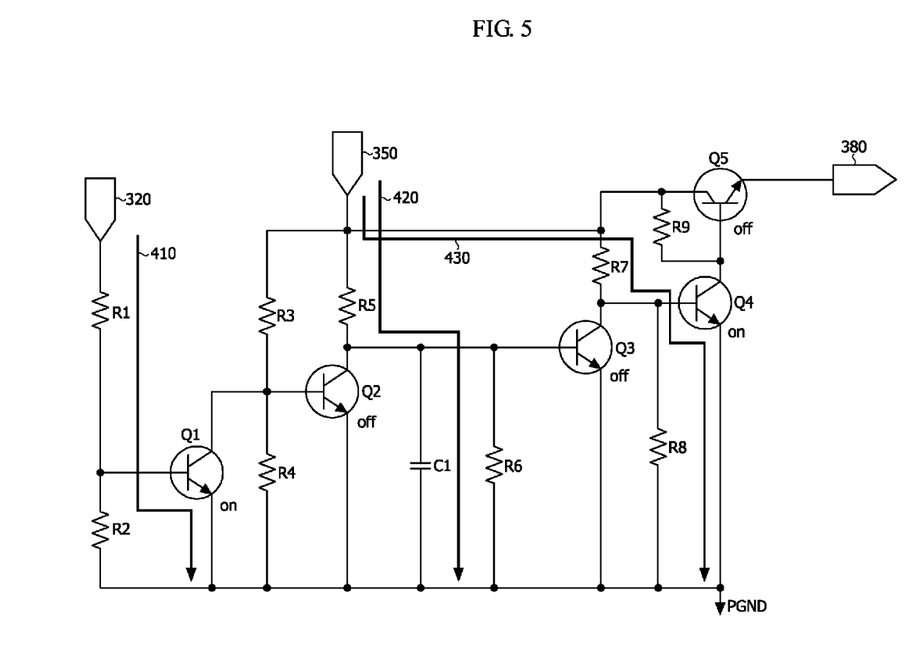
FIG. 5 is a view for describing generation of delay time in a time delay circuit according to one embodiment of the present invention.
Figure 6:
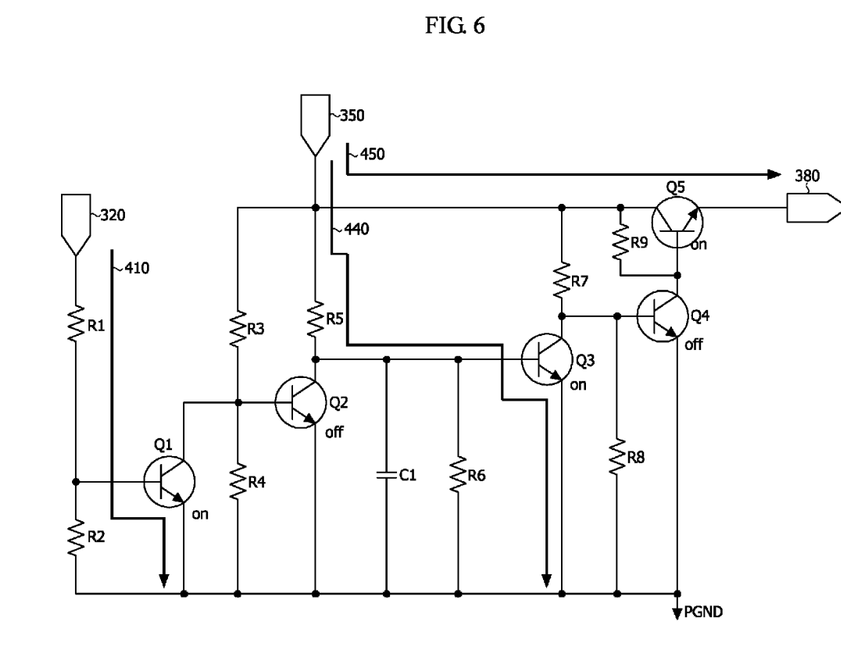
FIG. 6 is a view for describing outputting of power after a delay time according to one embodiment of the present invention.

FIG. 4 is a view for describing detection of power in a time delay circuit according to one embodiment of the present invention, FIG. 5 is a view for describing generation of delay time in a time delay circuit according to one embodiment of the present invention, and FIG. 6 is a view for describing outputting of power after a delay time according to one embodiment of the present invention.

With reference to FIGS. 4 to 6, an operation of the time delay circuit 300 according to one embodiment of the present invention will be described in detail.

First, referring to FIG. 4, when power is detected at the detection terminal 320, a detection current 410 flows from the detection terminal 320 to a switching terminal of the first switch Q1 to turn on the first switch Q1.

For example, when the first switch Q1 is a BJT, the switching terminal may be a base terminal, and the first switch Q1 may be turned on due to the detection current 410.

In another example, when the first switch Q1 is an FET, the switching terminal may be a gate terminal, and when input power is detected at the detection terminal 320, a voltage is applied to the gate terminal to turn on the first switch Q1.

When the first switch Q1 is turned on, the power detection signal indicating that the first switch Q1 is turned on is output, and the second switch Q2 is turned off due to the power detection signal.

For example, in a circuit as in FIG. 4, the power detection signal may indicate that no current is flowing in the switching terminal of the second switch Q2 or no voltage is applied to the switching terminal of the second switch Q2, due to the current flowing in the first switch Q1.

Next, referring to FIG. 5, when the LED driving power is input to the power input terminal 350, a charging current 420 may flow from the power input terminal 350 to the capacitor C1 and the second resistor R6 via the first resistor R5 because the second switch Q2 is in a turned-off state.

Since the third switch Q3 is in a turned-off state until the capacitor C1 is fully charged, a current 430 of the LED driving power input to the power input terminal 350, which is different from the charging current 420, flows to a switching terminal of the fourth switch Q4. Here, the fourth switch Q4 is turned on due to the current 430, and the fifth switch Q5 is turned off when the fourth switch Q4 is turned on. Since the fifth switch Q5 is turned off, the current due to the LED driving power cannot be output to the power output terminal 380.

Next, referring to FIG. 6, when the capacitor C1 is fully charged after the delay time has elapsed, the third switch Q3 is turned on. When the third switch Q3 is turned on, a current 440 due to the LED driving power flows from the power input terminal 350 to the third switch Q3. When the third switch Q3 is turned on, the current 430 stops flowing to a switching terminal of the fourth switch Q4, and the fourth switch Q4 is turned off. When the fourth switch Q4 is turned off, a current 450 flows to a switching terminal of the fifth switch Q5 via a resistor R9, and thereby the fifth switch Q5 is turned on.

When the fifth switch Q5 is turned on, the driving current 450 due to the LED driving power is output from the power input terminal 350 to the power output terminal 380 via the fifth switch Q5.

Referring to FIGS. 4 to 6, the time delay circuit 300 according to one embodiment of the present invention starts to operate from the detection of the input power, and, when the LED driving power is input, the LED driving power is output after being delayed by the time required for RC charging due to the LED driving power.

Figure 7:
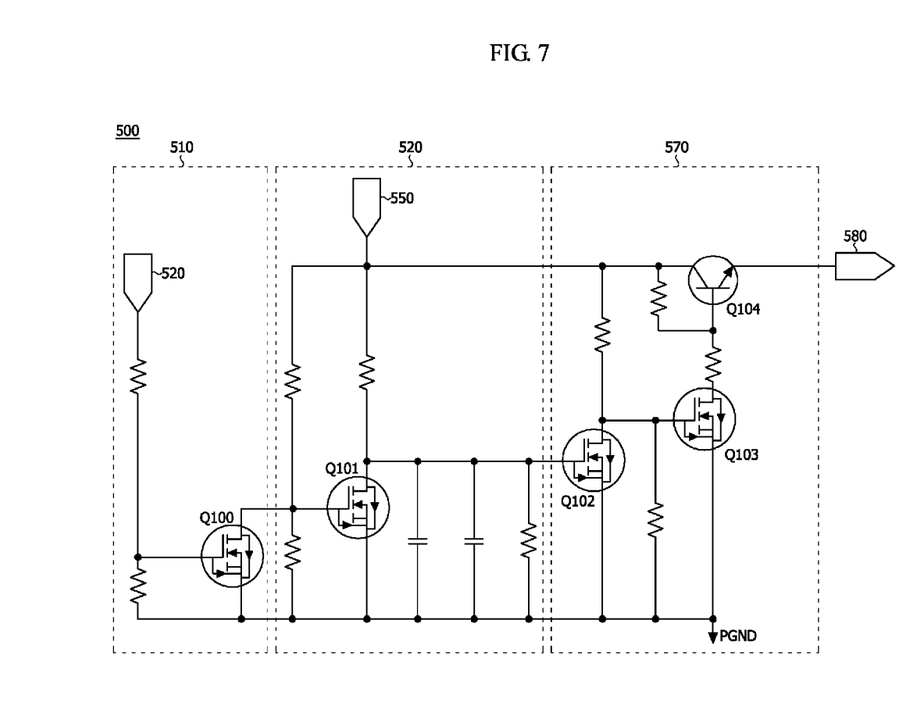
FIG. 7 is a view illustrating a time delay circuit according to another embodiment of the present invention.

FIG. 7 is a view illustrating a time delay circuit according to another embodiment of the present invention.

FIG. 7 is a circuit diagram illustrating a time delay circuit 500 according to another embodiment of the present invention.

Referring to FIG. 7, the time delay circuit 500 may include a power detector 510, a time delayer 520, and a power outputter 570. The power detector 510, the time delayer 520, and the power outputter 570 respectively correspond to the power detector 310, the time delayer 340, and the power outputter 370 according to one embodiment of the present invention.

Referring to FIG. 3 again, the switches Q1, Q2, Q3, Q4, and Q5 included in the power detector 310, the time delayer 340, and the power outputter 370 according to one embodiment of the present invention include BJTs as an example. Referring to FIG. 7, switches Q100, Q101, Q102, and Q103 included in the power detector 510, the time delayer 520, and the power outputter 570 according to another embodiment of the present invention include FETs. There is a difference in that a BJT is switched by a current while an FET is switched by a voltage. However, switching functions may be the same while only triggers of the switching are different from each other.

The power detector 510, the time delayer 520, and the power outputter 570 according to another embodiment of the present invention may respectively perform the same functions as the power detector 310, the time delayer 340, and the power outputter 370 according to one embodiment of the present invention.

Therefore, detailed descriptions on the power detector 510, the time delayer 520, and the power outputter 570 included in the time delay circuit 500 are omitted to avoid duplication.

Figure 8:
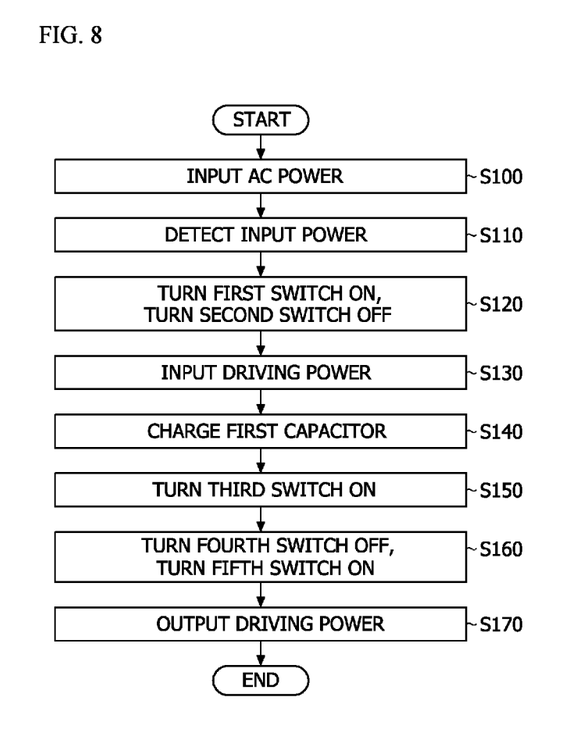
FIG. 8 is a flowchart illustrating a method of time delay according to one embodiment of the present invention.

FIG. 8 is a flowchart illustrating a method of time delay according to one embodiment of the present invention.

AC power is input to an LED driver provided with a time delay circuit (S100).

The time delay circuit detects whether power is input (S110). The time delay circuit may directly detect an input of AC power or DC power in which the AC power is rectified.

When the input power is detected, the time delay circuit turns on a first switch and thereby a second switch is turned off (S120). When the first switch is turned on, the time delay circuit may output the power detection signal, and the second switch may be turned off due to an output of a power detection signal.

The time delay circuit receives LED driving power for driving an LED (S130).

The time delay circuit charges a capacitor by the LED driving power (S140). The capacitor may be fully charged for a predefined delay time.

When the capacitor is fully charged, the time delay circuit outputs a delay time completion signal and turns on a third switch by the delay time completion signal (S150).

The time delay circuit turns off a fourth switch, and accordingly a fifth switch is turned on in sequence due to the turned-on state of the third switch (S160).

The time delay circuit outputs the input LED driving power due to the turned-on state of the fifth switch (S170).

According to the embodiments of the present invention, since power is supplied to an LED later than a light control signal, there is an effect of preventing the LED from flickering.

Although embodiments of the present invention have been described above with reference to the accompanying drawings, those skilled in the art should understand that the present invention may be implemented in other specific forms without modifying the technical spirit or essential features of the disclosure. Therefore, the above-described embodiments should be understood in a descriptive sense only in all aspects and should not be understood as the purpose of limitation.

What is claimed is:
1. A time delay circuit comprising:
   a power detector which detects whether alternating current (AC) power is applied and outputs a power detection signal when the AC power is applied;
   a time delayer which receives light emitting diode (LED) driving power, delays outputting of the input LED driving power by a predefined delay time when the power detection signal is output from the power detector, and outputs a delay time completion signal; and a power outputter which outputs the LED driving power to be output with the delay time when the delay time completion signal is input from the time delayer.

2. The time delay circuit of claim 1, wherein:
the power detector includes a first switch which is turned on when the AC power is applied; and
the power detection signal indicates that the first switch is turned on.

3. The time delay circuit of claim 2, wherein:
the first switch includes a bipolar junction transistor (BJT);
the AC power is applied to a base terminal of the BJT; and
the power detection signal indicates that a current flows to a collector terminal of the BJT due to the turn-on of the BJT.

4. The time delay circuit of claim 1, wherein the time delayer includes:
a first resistor whose one end is connected in series to a power input terminal to which the LED driving power is input;
a second switch connected to the other end of the first resistor and configured to be turned on due to the LED driving power when the power detection signal is not output and turned off when the power detection signal is output; and
a second resistor and a capacitor connected in parallel to the second switch,
wherein, the delay time is determined by time for the capacitor to be fully charged by the LED driving power.

5. The time delay circuit of claim 4, wherein:
the second switch includes a BJT;
one end of the first resistor is connected to the power input terminal and the other end thereof is connected to a collector terminal of the BJT;
a current input to the power input terminal is applied to a base terminal of the BJT to turn on the second switch when the power detection signal is not output from the power detector; and
the current input to the power input terminal is not applied to the base terminal of the BJT to turn off the second switch when the power detection signal is output from the power detector.

6. The time delay circuit of claim 4,
wherein a delay time (t and unit is in ms) is determined according to an equation $$"t = -RCLn\left(1 - \frac{V_o}{V_{in}}\right)",$$

where R is a total parallel equivalent resistance value (kΩ) of the first resistor and the second resistor, C is a capacitance value (μF) of the capacitor $V_{in}$ is a voltage value (V) of the input LED driving power, and $V_o$ is a voltage value (V) when the capacitor is fully charged.

7. The time delay circuit of claim 4, wherein the delay time completion signal indicates a voltage between both ends of the capacitor when the capacitor is fully charged.

8. The time delay circuit of claim 1, wherein the power outputter includes;
a third switch which is turned on due to the delay time completion signal;
a fourth switch which is turned off when the third switch is turned on;
a fifth switch which is turned on when the fourth switch is turned off; and a power output terminal through which the LED driving power to be output with the delay time is output when the fifth switch is turned on.

9. The time delay circuit of claim 8, wherein:
the third switch includes a BJT in which the delay time completion signal is applied to a base terminal of the BJT;
the fourth switch includes a BJT whose base terminal is connected to a collector terminal of the third switch; and
the fifth switch includes a BJT whose collector terminal is connected to the LED driving power, base terminal is connected to a collector terminal of the fourth switch, and emitter terminal is connected to the power output terminal.

10. The time delay circuit of claim 9, wherein:
the third switch is turned on when the delay time completion signal is applied to the base terminal of the third switch;
the fourth switch is turned off due to no current being input to the base terminal of the fourth switch according to the turn-on of the third switch; and
the fifth switch is turned on due to a current of the LED driving power being, input to the base terminal of the fifth switch according to the turn-off of the fourth switch.

11. A time delay circuit comprising:
a power input terminal to which a light emitting diode (LED) driving power is input;
a first switch whose switching terminal is connected to the power input terminal;
a second switch whose input terminal is connected to the power input terminal and switching terminal is connected to an input terminal of the first switch;
a third switch whose input terminal is connected to the power input terminal and switching terminal is connected to the input terminal of the second switch;
a fourth switch whose switching terminal is connected to the input terminal of the third switch;
a fifth terminal whose input terminal is connected to the power input terminal and switching terminal is connected to an input terminal of the fourth switch;
a capacitor whose ends are connected to each of the input terminal and an output terminal of the second switch and whose one end is connected to the switching terminal of the third switch; and
a power output terminal connected to an output terminal of the fifth switch and configured to output the LED driving power input to the power input terminal.

12. The time delay circuit of claim 11, wherein:
the first switch is turned on and the second switch is turned off when the LED driving power is input, to the power input terminal;
the LED driving power is applied to the capacitor when the second switch is turned off;
the capacitor is charged by the LED driving power for a predefined delay time;
the third switch is turned on due to a voltage between both ends of the capacitor being applied to the switching terminal of the third switch when the capacitor is fully charged;
the fourth switch is turned off when the third switch is turned on; and
the fifth switch is turned on to output the LED driving power applied to the input terminal when the fourth switch is turned off.

13. The time delay circuit of claim 12, wherein:
the input terminal of the fifth switch and the switching terminal of the fifth switch are connected to each other;
the LED driving power applied to the input terminal of the fifth switch is applied only to the input terminal of the fourth switch when the fourth switch is in a turned-on state; and
the LED driving power applied to the input terminal of the fifth switch is input to the switching terminal of the fifth switch to turn on the fifth switch when the fourth switch is in a turned-off state.

14. The time delay circuit of claim 12, wherein:
the first switch, the second switch, the third switch, the fourth switch, and the fifth switch include either a bipolar junction transistor (BJT) or a field effect transistor (FET);
the input terminal of the first switch, the second switch, the third switch, the fourth switch, or the fifth switch is either a collector terminal of the BJT or a drain terminal of the FET;
the switching terminal of the first switch, the second switch, the third switch, the fourth switch, or the fifth switch is either a base terminal of the BJT or a gate terminal of the FET; and
the output terminal of the first switch, the second switch, the third switch, the fourth switch, or the fifth switch is either an emitter terminal of the BJT or a source terminal of the FET.

15. An LED driver including the time delay circuit according to claim 1, comprising:
a power supply to which AC power is input;
a rectifier which rectifies the input AC power;
a standby circuit which outputs LED driving power to the time delay circuit on the basis of the rectified AC power; and
a light control circuit which receives a light control signal from a light controller and the LED driving power delayed by a predefined output delay time from the time delay circuit, and modifies the LED driving power according, to the light control signal to provide as power for an LED,
wherein the LED driving power is input to the light control circuit later than the light control signal by the delay time.

16. An LED driver including the time delay circuit according to claim 11, comprising:
a power supply to which AC power is input;
a rectifier which rectifies the input AC power;
a standby circuit which outputs LED driving power to the time delay circuit on the basis of the rectified AC power; and
a light control circuit which receives a light control signal from a light controller and the LED driving power delayed by a predefined output delay time from the time delay circuit, and modifies the LED driving power according to the light control signal to provide as power for an LED,
wherein the LED driving power is input to the light control circuit later than the light control signal by the delay time.

17. A light emitting diode (LED) driver comprising:
a power supply to which alternating current (AC) power is input;
a rectifier which rectifies the input AC power;
a standby circuit which outputs an LED driving power to a time delay circuit on the basis of the rectified AC power;
the time delay circuit which receives the LED driving power, delays the LED driving power by predefined delay time, and outputs the LED driving power; and
a light control circuit which receives a light control signal from a light controller and the LED driving power delayed by a predefined output delay time from the time delay circuit, and modifies the LED driving power according to the light control signal to provide as power for an LED,
wherein the LED driving power is input to the light control circuit later than the light control signal by the delay time.

18. The LED driver of claim 17, wherein the time delay circuit includes:
a power detector which detects whether AC power is applied and outputs a power detection signal when the AC power is applied;
a time delayer which receives the LED driving power, delays the output of the input LED driving power by a predefined delay time when the power detection signal is output from the power detector, and outputs a delay time completion signal; and
a power outputter which outputs the LED driving power to be output with the delay time when the delay time completion signal is input from the time delayer.

19. The LED driver of claim 18, wherein the time delayer includes:
a first resistor whose one end is connected in series to a power input terminal to which the LED driving power is input;
a second switch connected to the other end of the first resistor and configured to be turned on due to the LED driving power when the power detection signal is not output and turned off when the power detection signal is output; and
a second resistor and a capacitor connected in, parallel to the second switch,
wherein the delay time is determined by time for the capacitor to be fully charged by the LED driving power, and the delay time (t and unit is in ms) is determined according to an equation $$``t = -RCLn\left(1 - \frac{V_o}{V_{in}}\right)",$$

where R is a total parallel equivalent resistance value (kΩ) of the first resistor and the second resistor, C is a capacitance value (μF) of the capacitor $V_{in}$ is a voltage value (V) of the input LED driving power, and $V_o$ is a voltage value(V) when the capacitor is fully charged.

20. The LED driver of claim 17, wherein the time delay circuit includes:
a power input terminal to which the LED driving power is input;
a first switch whose switching terminal is connected to the power input terminal;
a second switch whose input terminal is connected to the power input terminal and switching terminal is connected to an input terminal of the first switch;
a third switch whose input terminal is connected to the power input terminal and switching terminal is connected to the input terminal of the second switch;
a fourth switch whose switching terminal is connected to the input terminal of the third switch;

a fifth terminal whose input terminal is connected to the power input terminal and, switching terminal is connected to an input terminal of the fourth switch;

a capacitor whose ends are connected to each of the input terminal and an output terminal of the second switch, and whose one end is, connected to the switching terminal of the third switch; and a power output terminal connected to an output terminal of the fifth switch and configured to output the LED driving power input to the power input terminal, wherein:

the first switch is turned on and the second switch is turned off when the LED driving power is input to the power input terminal;

the LED driving power is applied to the capacitor when the second switch is turned off;

the capacitor is charged by the LED driving power for a predefined delay time;

the third switch is turned on due to a voltage between both ends of the capacitor being applied to the switching terminal of the third switch when the capacitor is fully charged;

the fourth switch is turned off when the third switch is turned on; and the fifth switch is turned on to output the LED driving power applied to the input terminal when the fourth switch is turned off.

21. A method of time delay comprising:

inputting alternating current (AC) power;

detecting whether the AC power is input;

turning on a first switch by a detection current flowing to the first switch when the input of the AC power is detected, and turning off a second switch by a power detection signal indicating that the first switch is turned on;

inputting a light emitting diode (LED) driving power;

charging a capacitor for a predefined delay time due to the turned-off second switch;

turning on a third switch when the capacitor is fully charged;

turning off a fourth switch due to the turned-on third switch;

turning on a fifth switch due to the turned-off fourth switch; and outputting the LED driving power due to the turned-on fifth switch.

* * * * *